(12) United States Patent
Töpfer et al.

(10) Patent No.: US 6,705,063 B1
(45) Date of Patent: Mar. 16, 2004

(54) SEGMENTING DEVICE FOR PORTIONABLE FILLING IN A FLEXIBLE TUBULAR CASING

(75) Inventors: Klaus Töpfer, Büttelborn (DE); Günther Vermehren, Usingen (DE)

(73) Assignee: Poly-clip System GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 10/031,553

(22) PCT Filed: Jun. 23, 2000

(86) PCT No.: PCT/EP00/05842
§ 371 (c)(1),
(2), (4) Date: Apr. 9, 2002

(87) PCT Pub. No.: WO01/06859
PCT Pub. Date: Feb. 1, 2001

(30) Foreign Application Priority Data

Jul. 26, 1999 (DE) .......................... 199 34 154

(51) Int. Cl.[7] .............................. B65B 9/12; B65B 9/15; B65B 51/05
(52) U.S. Cl. ........................ 53/577; 53/138.4; 53/551
(58) Field of Search ................ 53/138.4, 226, 53/374.2, 374.9, 551, 567, 577

(56) References Cited

U.S. PATENT DOCUMENTS

| 1,424,363 | A | * | 8/1922 | Leuman ...................... 53/226 |
| 1,934,756 | A | * | 11/1933 | Smith .......................... 53/226 |
| 2,009,241 | A | * | 7/1935 | Roberts ....................... 53/226 |
| 3,214,883 | A | * | 11/1965 | Omori ........................ 53/138.4 |
| 4,218,861 | A | * | 8/1980 | Marz ........................... 53/138.4 |
| 4,593,516 | A | * | 6/1986 | Alameda et al. ............ 53/138.3 |
| 4,675,945 | A | * | 6/1987 | Evans et al. ................ 53/138.4 |
| 5,087,463 | A |   | 2/1992 | Raudys et al. ............... 426/138 |
| 5,155,976 | A | * | 10/1992 | Okabe et al. .................. 53/527 |
| 5,495,707 | A |   | 3/1996 | Lauzon ......................... 53/572 |
| 5,548,947 | A | * | 8/1996 | Fincham et al. ............... 53/551 |
| 5,918,447 | A | * | 7/1999 | Hanten et al. ................. 53/551 |
| 6,298,635 | B1 |   | 10/2001 | Bienert et al. ................ 53/417 |
| 6,502,367 | B1 | * | 1/2003 | Sterner et al. .............. 53/138.3 |

FOREIGN PATENT DOCUMENTS

| CH | 170 301 | 11/1934 | |
| DE | 1 882 434 | 11/1963 | |
| DE | 25 50 042 | 5/1977 | ............. B65B/9/12 |
| DE | 196 06 654 C1 | 4/1997 | ............. B65B/9/15 |
| DE | 117817 | 10/1998 | |
| EP | 0 507 374 A1 | 10/1992 | ........... A22C/11/02 |
| FR | 1 557 553 | 2/1969 | |
| JP | 6-40415 | * 6/1994 | |

* cited by examiner

*Primary Examiner*—John Sipos
(74) *Attorney, Agent, or Firm*—Norris McLaughlin & Marcus

(57) ABSTRACT

This invention concerns a segmenting device in particular for the manufacture (portioning) of sausages from a string of sausage filling in a flexible tubular casing, which consists of a plurality of tye elements (12) in the form of strips which can be rotated against each other. One of their ends is secured locally in a ring concentric to the axis of the casing at regular intervals, and whereas the other end region is collected to form a ring (11) concentric with the axis of the casing, which, relative to this, can undergo movement of a rotational nature as well as parallel movement in their major plane, at least tee tying elements are provided, whose contact surface segments, which face the opening, are bent or curved in the main plane. In this manner each strip impinges on the casing with several contact surface segments and promotes the radial tying of the casing, avoiding shearing movements between the casing and the strips.

7 Claims, 6 Drawing Sheets

SEGMENTING DEVICE FOR PORTIONABLE FILLING IN A FLEXIBLE TUBULAR CASING

This is a 371 of PCT/EP0015842 filed Jun. 23, 2000 (international filing date).

This invention relates to a segmenting device for portionable filling in a flexible tubular casing, comprising crimping elements which can be swivelled against each other so as to overlap each other and be symmetrical with respect to the tube axis, which crimping elements together circumscribe an opening of variable size and, by reducing the opening, crimp the filled tube, the crimping elements consisting of strips the ends of which are stationarily pivotally mounted with equal spacings on a circle concentric with respect to the tube and opening axis, while their other end portions are guided in a ring which is likewise concentric with respect to the tube and opening axis and can be rotated around the same to a limited extent, such that they extend in the graduated circle of their swivel bearings in a chord-like manner and can perform both swivel and longitudinal movements with respect to the ring in their main plane.

BACKGROUND OF THE INVENTION

Such segmenting device, namely for portioning individual sausages from a sausage strand, is known from DE 196 06 654 C1. There are provided at least four strips as crimping elements, which in each opening and closing position always extend in parallel in pairs and circumscribe a square (each of a different size). Regardless of their usability, it turned out in the operation of this known device that a square crimping opening in particular in the case of tubular packages of a large diameter can lead to problems in the formation of the crimping neck at the tubular casing; even if due to the reduced relative shearing movements between the tubular casing and the crimping elements the movement of all four strips during crimping represents a distinct improvement as compared to the conventional segmenting devices with two linearly or pivotally movable crimping elements with two active surfaces generally extending at right angles to each other (DE 36 10 010 A1, DE 25 50 042 A1).

SUMMARY OF THE INVENTION

It is the object underlying the invention to improve the neck formation during the closing operation of the segmenting device especially in the case of tubular packages of a larger diameter—while maintaining reduced shearing movements or even further reducing the neck formation during the closing operation of the segmenting device. In accordance with the invention, this object is solved in that at least three crimping elements are provided, whose active surfaces facing the opening are bent or curved in the main plane. In this way, the opening is given a shape approaching the more or less ideal circular shape of the finally obtained neck of the tubular casing—which is regularly permanently fixed and closed by means of likewise substantially circular closure clips—, where at the same time the larger number of active surface portions at the crimping elements, which are distributed over the periphery, promotes the radial crimping of the tubular casing towards the tube and opening axis, so that shearing movements between the tubular casing and the crimping elements are omitted almost completely.

The advantageous effect of this design and arrangement of the crimping elements which, in contrast to known segmenting devices with crimping elements which are pivotable and are provided with a plurality of active surfaces extending at an angle with respect to each other, are not pivotable about one and the same axis, but about a plurality of axes distributed around the periphery, is promoted even more when bending or curving the crimping elements is effected at an obtuse angle.

DETAILED DESCRIPTION

In general, the crimping elements are made of a relatively thin-walled (as compared to their width) sheet. In accordance with an embodiment of the invention it is therefore provided that the crimping elements are bent twice (in a Z-shaped manner) out of their (original) main plane by substantially the thickness of the crimping elements along a line extending radially with respect to the tube and opening axis. In this way, all crimping elements can each be pivoted in the same plane, so that they need not be staggered parallel to the tube and opening axis. However, the plane of the respective one swivel axis of all crimping elements is offset with respect to the plane of the respective other swivel axis parallel to the tube and opening axis, so that the active surfaces engaging the tubular casing during the crimping operation alternately lie in the one and in the other plane in peripheral direction. However, it is of considerable advantage that even in the case of three, four or even more elements only two adjacent planes are covered by the crimping elements and thus the total thickness of the segmenting device substantially only corresponds to twice the thickness of the crimping elements.

When the inventive segmenting device is part of a spreader, which has two sets of crimping elements which in the closing condition can be moved into an axial distance from each other, the crimping elements of the second set can advantageously be mutually offset with respect to those of the first set by one quarter of the spacing angle of adjacent elements around the tube and opening axis. This will 'round' the circumscribed opening even more, and it is possible for instance to distribute a total of four crimping elements among two sets of two crimping elements each, without returning to the disadvantages of the prior art (DE 36 10 010 A1, DE 25 50 042 A1).

In a spreader as mentioned above, the two sets of crimping elements can furthermore be rotatable and drivable during the spreading operation in synchronism with each other or against each other, in order to thus improve the neck formation even more. Moreover, it may be expedient to close the two sets of crimping elements one after the other, in order to ensure the withdrawal of tube material and to thus prevent the tube material from being overloaded in the crimping area.

BRIEF DESCRIPTION OF THE DRAWINGS

Embodiments of the invention will now be illustrated in the drawings, in which:

As is illustrated in FIG. 3, the segmenting device 1 of FIG. 1 is disposed concentrically with respect to the axis 2 of a filling tube 3 of a filling machine (not shown) for producing individual successive sausages from a filled sausage strand. On the filling tube 3 a supply of tubular casing 4 is provided, which during the filling operation is withdrawn through a casing brake 5. The axis 2 of the filling tube at the same time represents the axis of the tubular casing 4 and the opening 6 of the segmenting device 1. FIG. 3 furthermore shows the filled sausage strand 7, which at its front end in filling direction is closed by a clip 8 around the neck 9.

Figure 1:
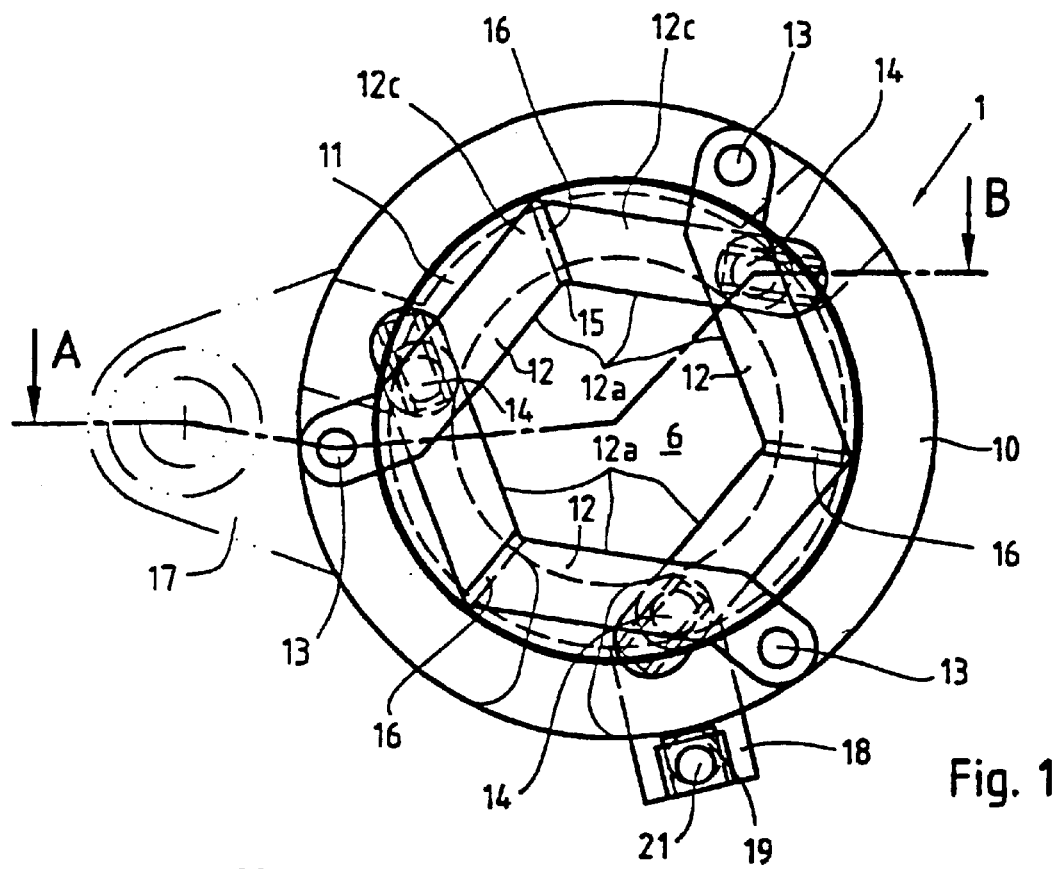
FIG. 1 shows a top view of an inventive segmenting device in the open condition.
Figure 3:
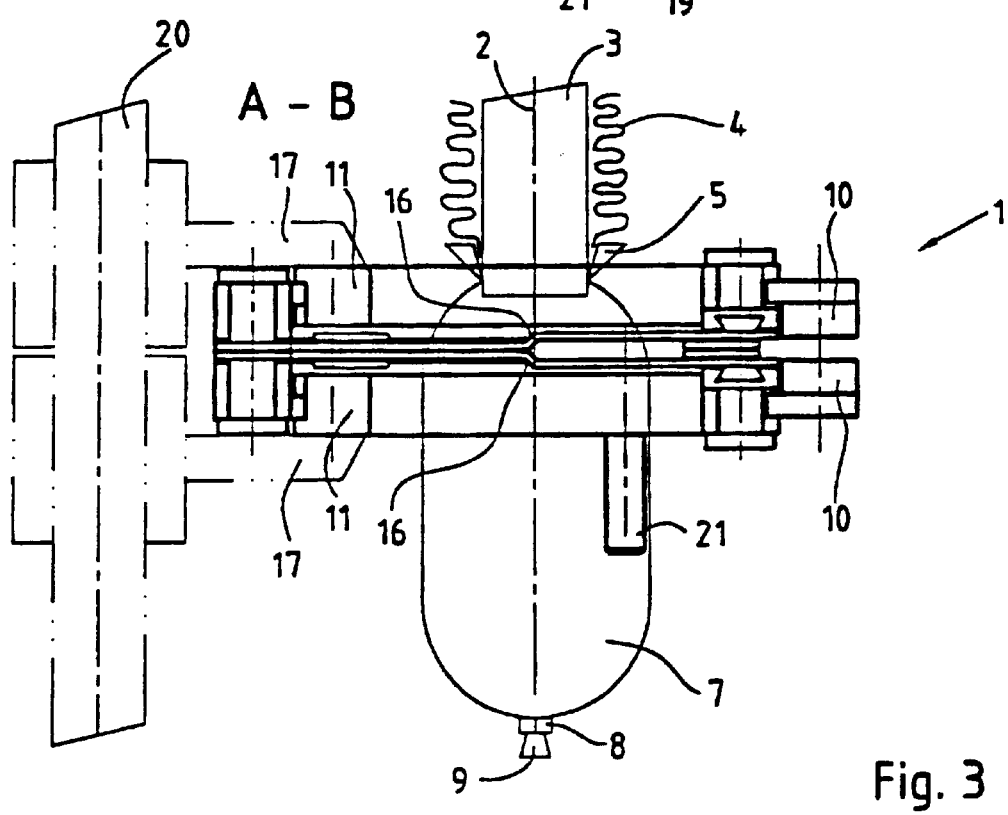
FIG. 3 shows a section through a spreader with two segmenting devices of the type shown in FIG. 1, which are congruently disposed one beside the other.
Figure 4:
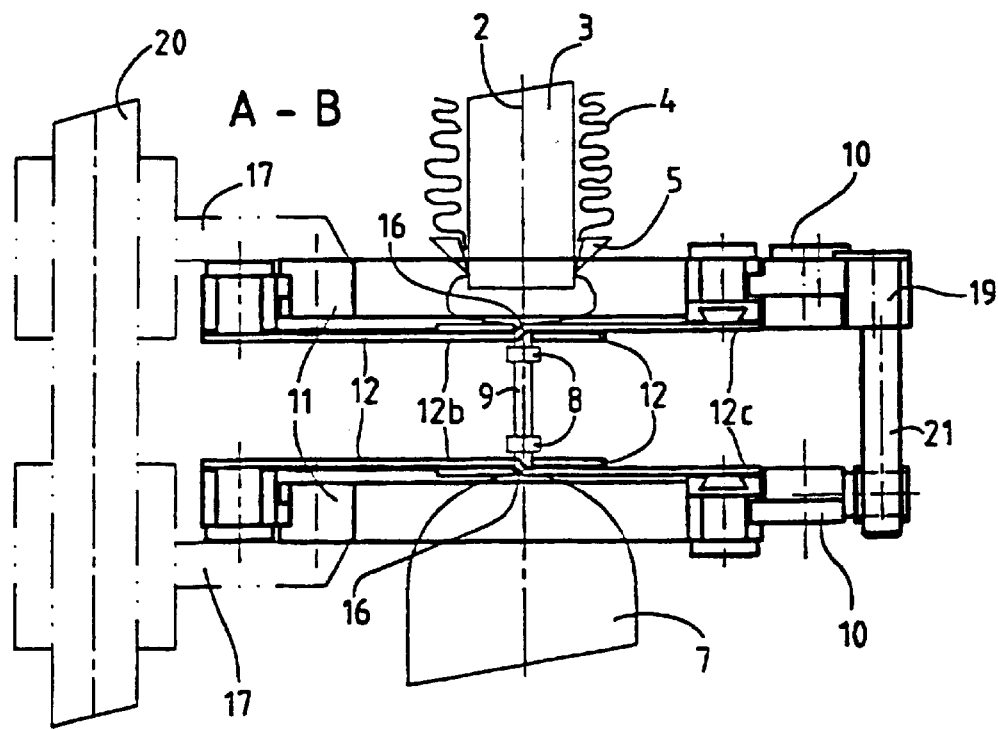
FIG. 4 shows the spreader in accordance with FIG. 3 in the closed and spread condition.

Filling the sausage strand through the segmenting device—which is open according to FIGS. 1 and 3—is continued until the desired portion size is achieved. Then, the segmenting device is moved into the closing position represented in FIG. 2 and—in the case of a spreader comprising two segmenting devices 1 as shown in FIG. 4—the segmenting devices are moved into the spread position shown there, tubular casing 4 being withdrawn from the filling tube 3. In the spread position, two clips 8 are placed on the neck 9 formed by the closed segmenting device and elongated during spreading, whereupon the neck 9 can be cut through between said clips.

As shown in FIG. 1, the segmenting device has an outer ring 10 and an inner ring 11 concentrically guided therein. At 13, three crimping elements 12 are pivotally mounted on the outer ring 10 with one end each, while the other ends are likewise pivotally and, to a small extent, longitudinally movably mounted on the inner ring 11 by means of a combined sliding block and axle guideway 14.

The crimping elements 12 consist of flat strips, which in the example of FIGS. 1 to 4 are bent at an obtuse angle (120°) at 15, so that the three crimping elements with two active surfaces 12a each form an equal-sided hexagonal opening 6. Moreover, the crimping elements 12 are each bent twice along a line extending radially from the axis 2 through the bending point 15; the bend 16 leads to an offset of the two portions 12b and 12c of each crimping element 12 by about the sheet thickness of the crimping element in the direction of the axis 2 (FIG. 3).

The inner ring 11 is attached to an only indicated holder 17 and by means of the same to the filling machine with the filling tube 3. A pivot 18 is used for rotating the outer ring 10 with respect to the inner ring 11. By means of an adjustable eccentric 19, the basic adjustment between the two rings 10, 11 and thus the size of the opening 6 can be changed with the same relative position of the rings 10, 11 with respect to each other.

When the segmenting device 1 is doubled to form a spreader, the relative longitudinal axial movement of the two segmenting devices 1 (sets of crimping elements 12) is enabled by the rod 20 belonging to the holder 17 and by a rod 21 provided with the eccentric 19 (which rod 21 is diametrically opposed to the rod 20).

Figure 2:
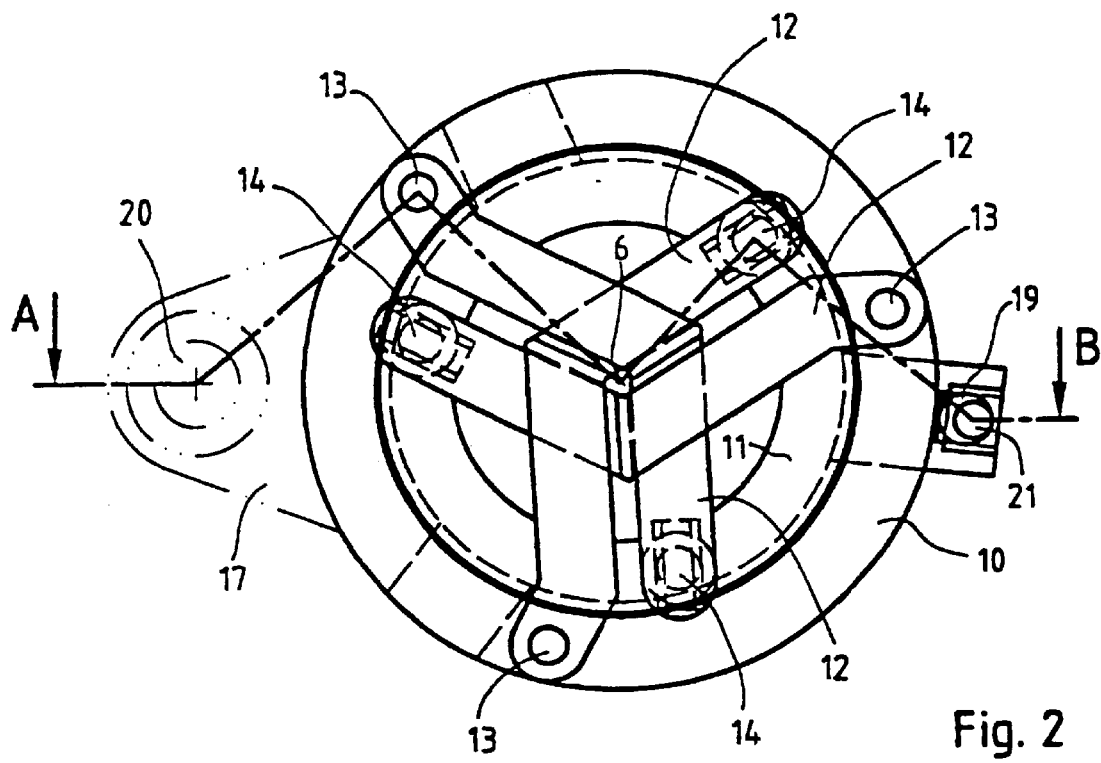
FIG. 2 shows the segmenting device of FIG. 1 in the closed condition.
Figure 5:
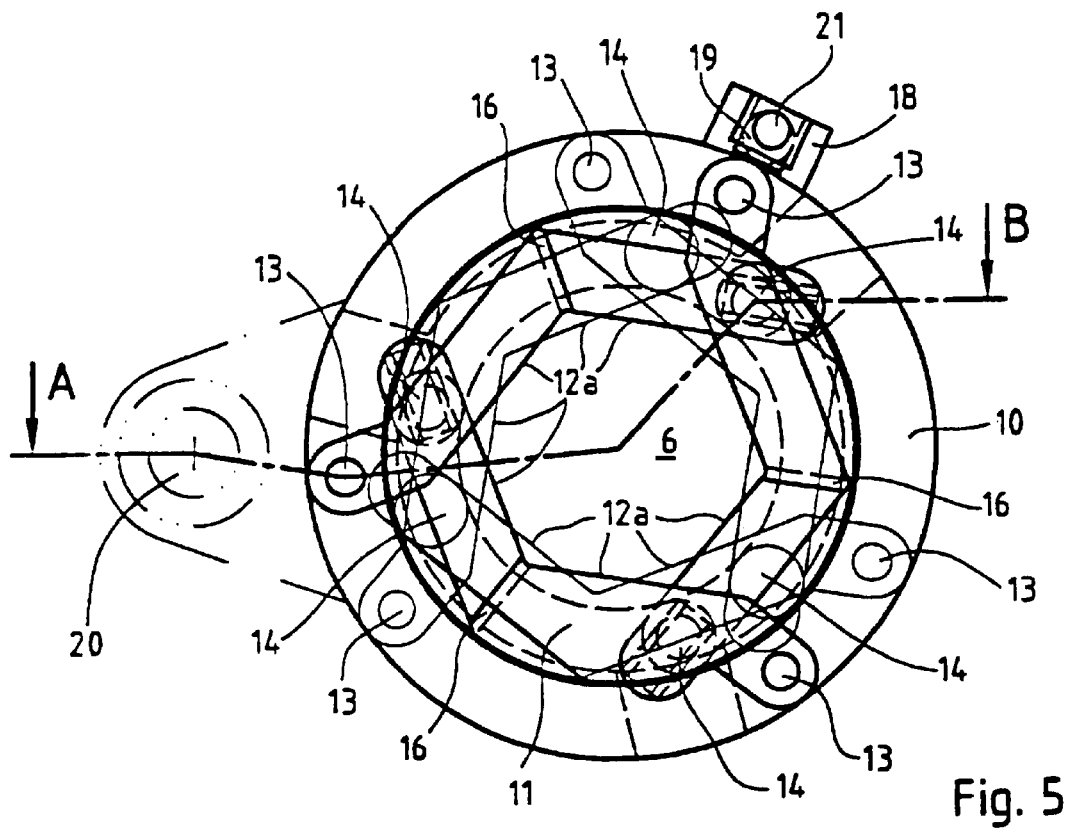
FIG. 5 shows a top view of a spreader comprising two segmenting devices (sets of crimping elements) of the type shown in FIG. 1 (open), which are rotated against each other.
Figure 6:
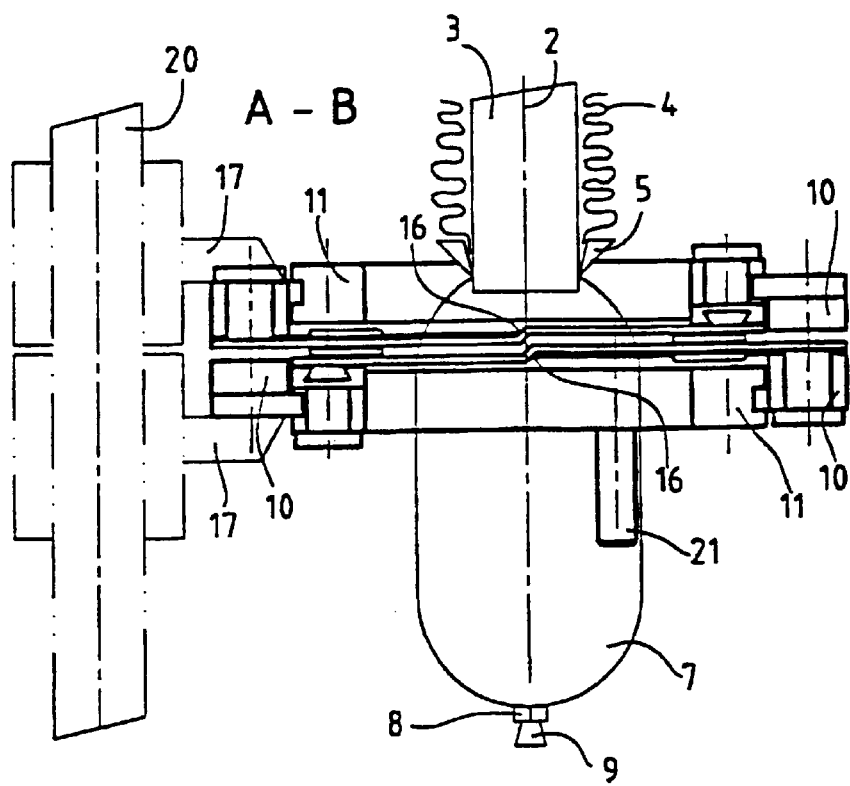
FIG. 6 shows a section of the spreader of FIG. 5.
Figure 7:
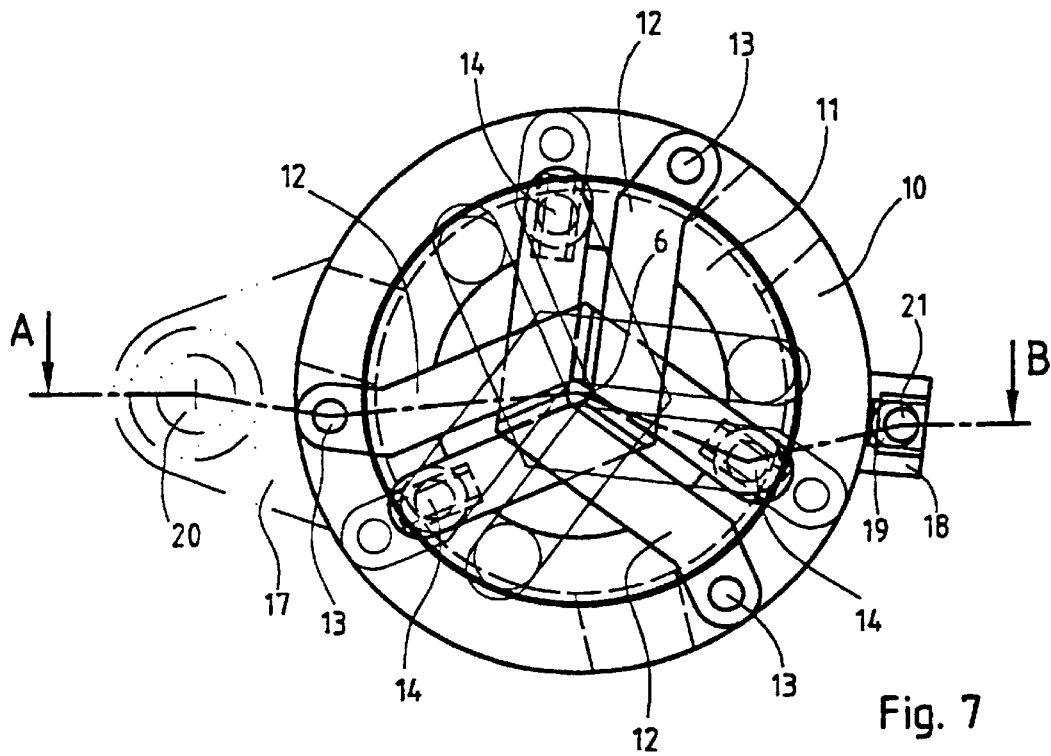
FIG. 7 shows the spreader of FIG. 5 in the closed condition.
Figure 8:
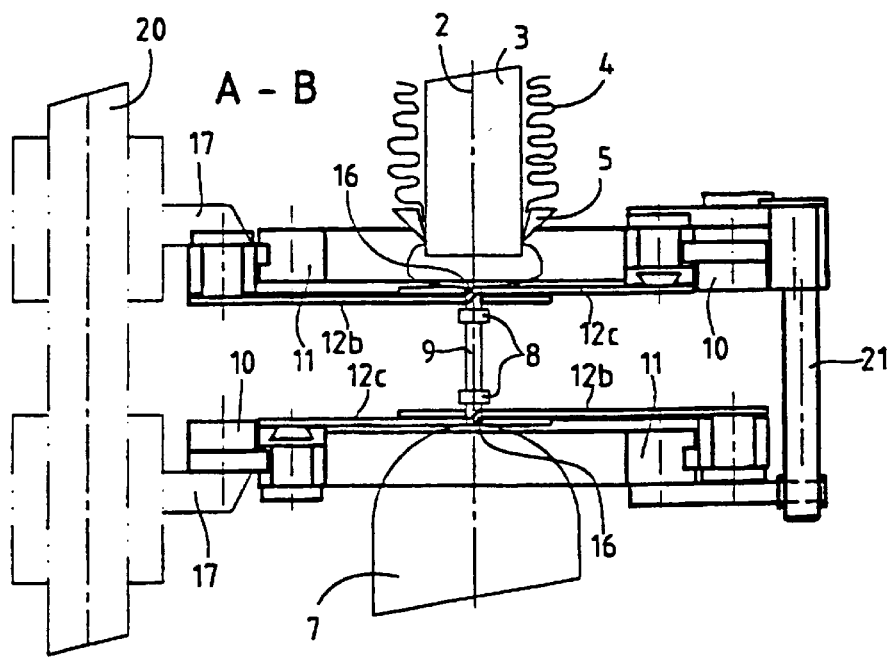
FIG. 8 shows the spreader in accordance with FIG. 7 in the spread condition.
Figure 9:
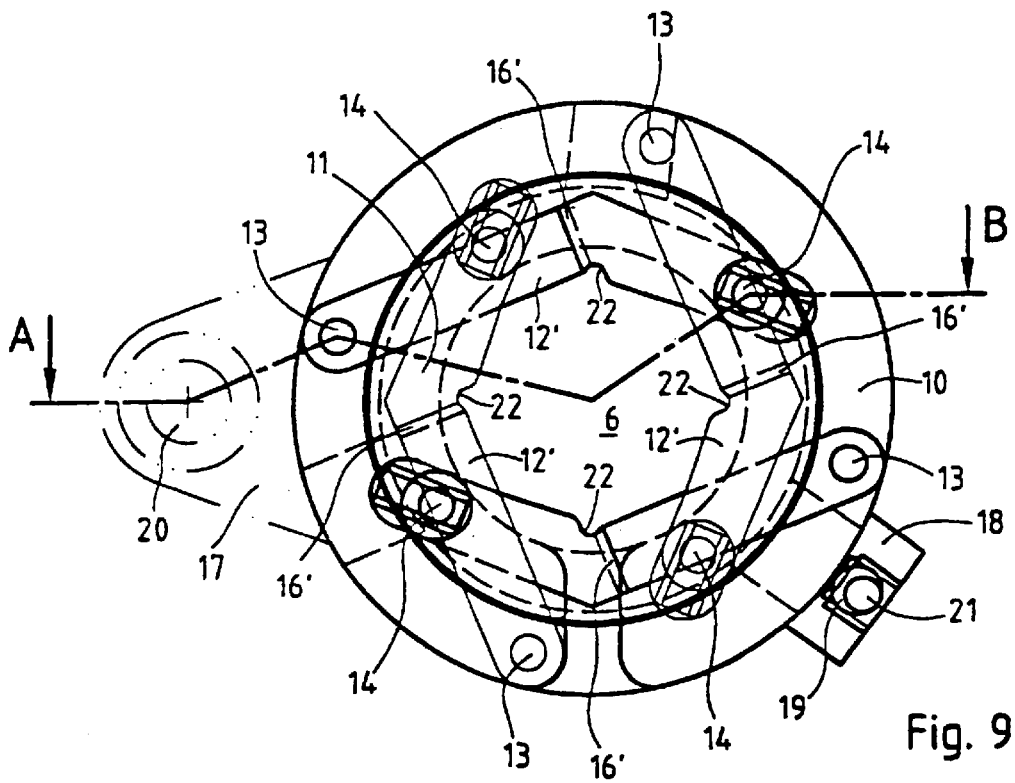
FIG. 9 shows another embodiment of the inventive device with a total of four crimping elements in the form of two sets (segmenting devices) with two crimping elements each, which are rotated against each other (opened) by half the spacing angle—analogous to FIG. 5.
Figure 10:
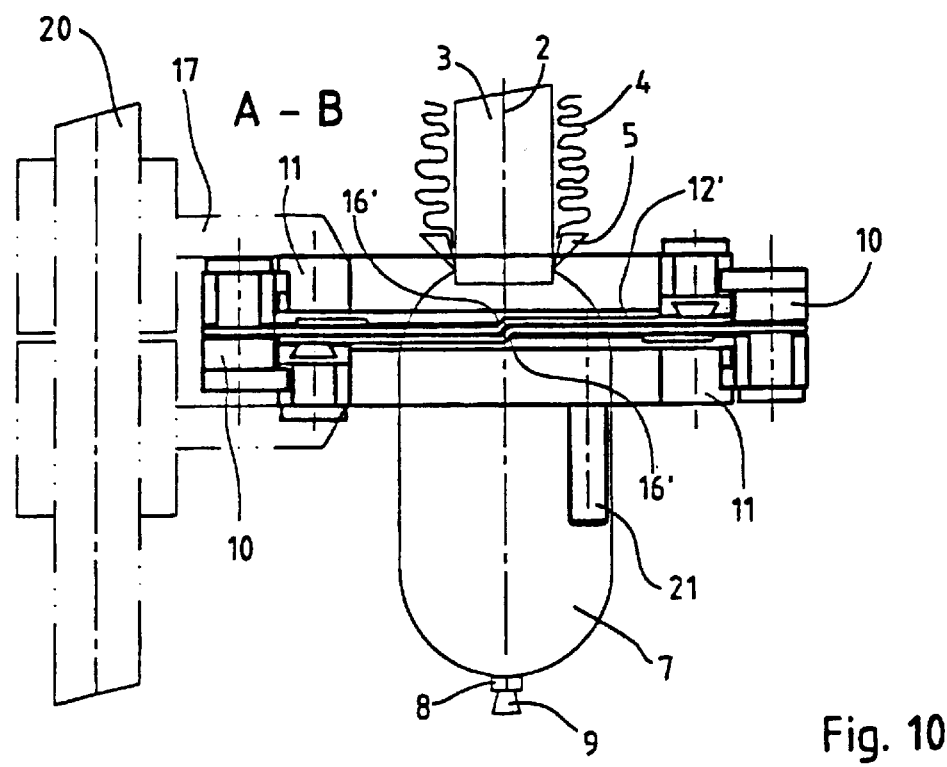
FIG. 10 shows a section of the device in accordance with FIG. 9.
Figure 11:
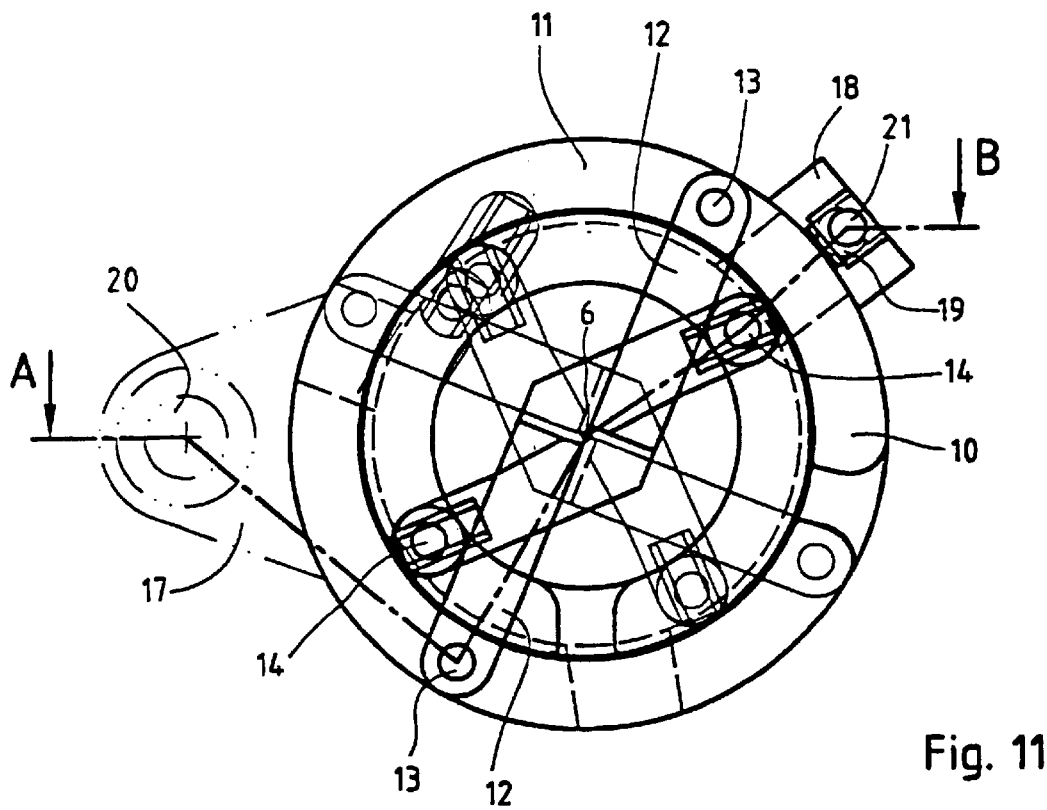
FIG. 11 shows the device in accordance with FIG. 9 in the closed condition.
Figure 12:
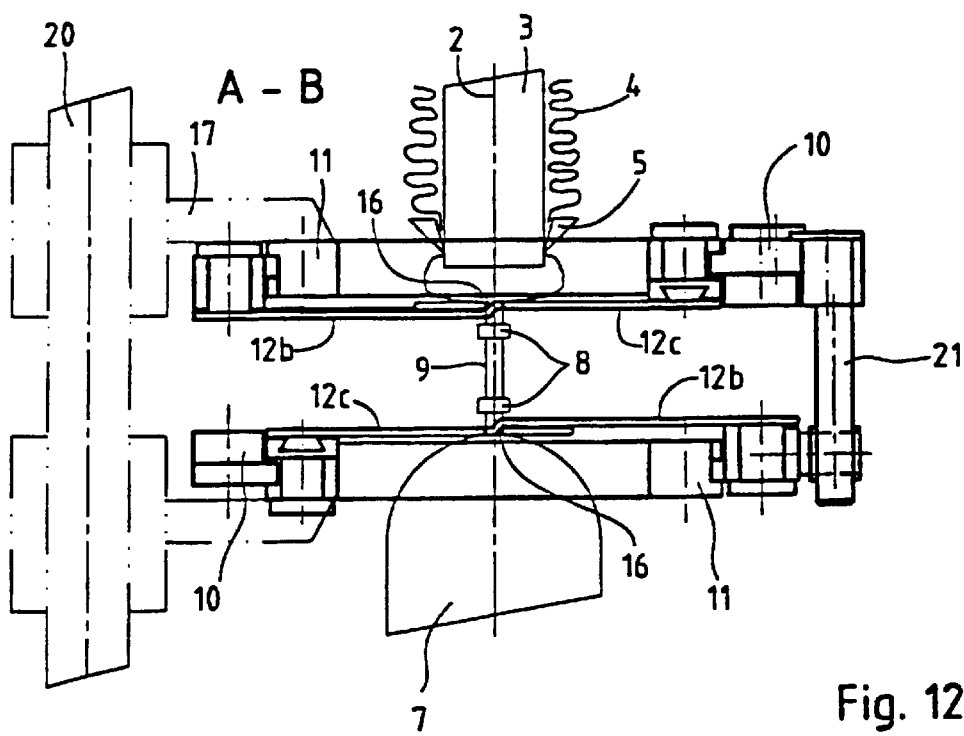
FIG. 12 shows the device in accordance with FIG. 9 in the operating condition of FIG. 11 in the spread position.

The spreader represented in FIGS. 5–8, like the spreader in accordance with FIGS. 3, 4, likewise comprises two segmenting devices 1 in accordance with FIGS. 1 and 2, but the two segmenting devices (sets of crimping elements 12) are mutually offset by one quarter of the spacing angle of adjacent elements 12 around the tube and opening axis 2, thus by 30 in the illustrated case. To illustrate this, the crimping elements of the one segmenting device are shown In FIG. 5 with lines of a different thickness as compared to the crimping elements of the other segmenting device. In addition, with this example it is the outer ring 10 which is attached to holder 17 (again only indicated), and the inner ring 11 is rotable relatively to the outer ring 10. FIG. 7 clearly shows that in particular in the closed condition of the spreader, the opening 6 greatly approaches the desired circular shape, although the active surfaces of the (bent) crimping elements 12 have linear edges.

The same is true for the spreader as shown in FIGS. 9–12, which comprises a total of four crimping elements 12', which with two elements each are distributed among the two sets of the individual segmenting devices rotated against each other by 90°. The crimping elements 12' are also bent, but in addition have recesses 22 in the vicinity of the bending line 15', and line 16 of the double bend does not extend radially with respect to the axis 2, but at an angle offset with respect to the same. Despite the small total number of crimping elements 12', these measures do not lead to a sufficiently rounded opening 6' in the closed condition (FIG. 11) with a still small enough shearing movement between the tubular casing 4 and the active surfaces 12a' of the crimping elements 12'.

What is claimed is:

1. A segmenting device for portionable filling in a flexible tubular casing, comprising crimping elements which together circumscribe an opening of variable size and are bent twice, into a Z-shape, the parallel legs of the Z shape being spaced apart substantially the thickness of the crimping elements and which elements can be swiveled against each other so as to overlap each other and be symmetrical with respect to the axis of the opening with the Z bends extending along radial lines with respect to the central axis of the opening in the open and closed positions of said elements and which, by reducing the opening, operate to crimp a filled tubular casing placed in the opening, the crimping elements being comprised of strips having two ends, the first ends of which are stationarily pivotally mounted with equal spacings on a circle concentric with respect to the axis of the opening, while their second ends are guided in a ring which is likewise concentric with respect to the axis of the opening and which can be rotated around the axis to a limited extent, such that the second ends of the crimping elements extend in a chord-like manner and can perform both swivel and longitudinal movements with respect to the ring, wherein at least three crimping elements are provided, having active surfaces which face the opening and are bent or curved in a plane perpendicular to the axis of the opening.

2. The segmenting device as claimed in claim 1, wherein the bend or curvature form each of said crimping elements into two legs at an obtuse angle to each other.

3. The segmenting device as claimed in claim 1 comprising two sets of crimping elements positioned along said axis which in the closing condition can be moved into an axial distance from each other, wherein the crimping elements of the second set are offset with respect to those of the first set by a part of the spacing angle of adjacent elements around the tube and opening axis.

4. The segmenting device as claimed in claim 3, wherein a total of four crimping elements are distributed among two sets of two crimping elements each and the same are offset against each other by half the spacing angle of the respective two elements around the tube and opening axis.

5. The segmenting device as claimed in claim 1, comprising two sets of crimping elements positioned along said axis which in the closing condition are moveable into an axial distance from each other wherein, during a spreading operation the two sets of crimping elements are rotatable and drivable in synchronism with each other or against each other.

6. The segmenting device as claimed in claim 3 wherein the two sets of crimping elements can be closed one after the other.

7. The segmenting device as claimed in claim 5 wherein the two sets of cnmping elements can be closed one after the other.

* * * * *

UNITED STATES PATENT AND TRADEMARK OFFICE
CERTIFICATE OF CORRECTION

PATENT NO. : 6,705,063 B1
DATED : March 16, 2004
INVENTOR(S) : Topfer et al.

It is certified that error appears in the above-identified patent and that said Letters Patent is hereby corrected as shown below:

Column 4,
Line 42, "apart substantially" should read -- apart by substantially --

Signed and Sealed this

Fifteenth Day of February, 2005

JON W. DUDAS
*Director of the United States Patent and Trademark Office*